(12) United States Patent
Benes et al.

(10) Patent No.: US 8,829,143 B2
(45) Date of Patent: Sep. 9, 2014

(54) REACTIVE INORGANIC CLUSTERS

(75) Inventors: Hynek Benes, Prague (CZ);
Jean-Francois Gerard, Bron (FR);
Ludovic Valette, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 304 days.

(21) Appl. No.: 13/265,660

(22) PCT Filed: Apr. 29, 2010

(86) PCT No.: PCT/US2010/032967
§ 371 (c)(1),
(2), (4) Date: Oct. 21, 2011

(87) PCT Pub. No.: WO2010/127116
PCT Pub. Date: Nov. 4, 2010

(65) Prior Publication Data
US 2012/0041170 A1    Feb. 16, 2012

Related U.S. Application Data

(60) Provisional application No. 61/174,255, filed on Apr. 30, 2009.

(51) Int. Cl.
*C08G 77/06* (2006.01)
*C08G 77/26* (2006.01)

(52) U.S. Cl.
CPC ..................................... *C08G 77/26* (2013.01)
USPC .............. 528/38; 528/22; 525/100; 525/393; 525/446; 525/477

(58) Field of Classification Search
None
See application file for complete search history.

(56) References Cited

U.S. PATENT DOCUMENTS

| 4,617,183 | A | * | 10/1986 | Lewis et al. ................... 423/630 |
| 4,678,657 | A | * | 7/1987 | Sood et al. .................... 423/600 |
| 5,300,611 | A | | 4/1994 | Fujioka et al. |
| 5,650,474 | A | * | 7/1997 | Yamaya et al. ................ 528/12 |
| 6,395,858 | B1 | | 5/2002 | Mack et al. |
| 2007/0092776 | A1 | | 4/2007 | Akiyama et al. |

FOREIGN PATENT DOCUMENTS

| GB | 882062 | | 11/1961 |
| JP | 04-246846 | * | 9/1992 |
| JP | 6-240000 A | * | 8/1994 |
| JP | 07-157490 | | 6/1995 |
| JP | 07-316538 | | 12/1995 |
| JP | 2002-68727 | * | 3/2002 |
| JP | 2002-068727 | * | 3/2002 |
| JP | 2002-194064 | * | 7/2002 |

OTHER PUBLICATIONS

Machine-generated translation of JP 6-240000 into the English language (Oct. 2013).*
Machine-generated translation of JP 2002-194064 into the English language (Oct. 2013).*
Yacoub-George E., et al., "Preparation of Functionalized Polyorganosiloxane Spheres for the Immobilization of Catalytically Active Compounds", Journal of Non-Crystalline Solids, Jan. 1, 1994 North-Holland Physics Publishing. Amsterdam, NL—ISSN 0022-3093, vol. 167, Nr:1/02, Jan. 1, 1994, pp. 9-15. (XP000424526).
International Search Report & Written Opinion from related PCT Application PCT/US2010/032967, dated Jul. 30, 2010, 14 pages.
International Preliminary Report on Patentability from related PCT Application PCT/US2010/032967, dated Feb. 8, 2011, 6 pages.

* cited by examiner

*Primary Examiner* — Marc Zimmer
(74) *Attorney, Agent, or Firm* — Brooks, Cameron & Huebsch, PLLC

(57) ABSTRACT

Storage-stable reactive inorganic clusters and a process for preparing such storage-stable reactive inorganic clusters (e.g., silica structures) having, for example, reactive amino groups. The storage-stable reactive inorganic clusters may be used as a curing agent for thermosetting resin compositions such as epoxy resins.

8 Claims, No Drawings

US 8,829,143 B2

REACTIVE INORGANIC CLUSTERS

This application is a National Stage application under 35 U.S.C. 371 of PCT/US2010/032967, filed on Apr. 29, 2010 and published as WO 2010/127116 on Nov. 4, 2010, which claims the benefit in part from U.S. Provisional Application Ser. No. 61/174,255 filed Apr. 30, 2009, the entire contents of which are incorporated herein by reference.

BACKGROUND OF THE INVENTION

1. Field of the Invention

The present invention is related to reactive inorganic clusters with reactive functionalities, such as amino groups; and a process for preparing such reactive clusters. The clusters may be used as curing agents for thermosetting resins.

2. Description of Background and Related Art

Silicon-containing materials produced by prior art methods are known to be useful as fillers in various compositions. For example, in some applications, it is desired to incorporate silica structures into a resin matrix, such as a thermosetting resin, by chemically reacting the silica structures with the resin to provide organic-inorganic hybrid materials in order to improve the thermo-mechanical properties of the resin. For example, thermosetting resins, such as epoxy resins, are typically used in the field of electrical and electronic materials; and for these applications materials with improved heat resistance (e.g. glass transition temperature greater than 120° C., decomposition temperature measured at 5% weight loss greater than 300° C.) and low coefficient of linear expansion (CTE) (e.g., less than 60 ppm/K at 25° C.) are required. It is known that incorporating silica structures into an epoxy matrix can lead to improved thermo-mechanical properties.

It is also well known to produce silicon-containing materials by various processes. Then, as aforementioned, these pre-formed silica structures may be used, for example, as fillers or additives in various compositions. In addition to processes that produce typical pre-formed non-reactive silica fillers, there is a known process, commonly referred to as a "sol-gel in-situ process," that can be used to produce reactive silica systems.

There are several routes which use a sol-gel process to prepare an organic/inorganic hybrid material for thermosetting resins such as epoxy resins. For example, in general, a first route related to known sol-gel processes, involves preparing a silicon-modified epoxy resin containing hydrolysable alkoxysilane groups, which condense during reaction with water. Then the resulting system is cured with a conventional hardener at an elevated temperature.

A second route consists of first preparing a partial condensate of an alkoxysilane, which in turn, is mixed with an epoxy resin. The resulting system is then cured with a hardener at an elevated temperature.

A third route involves preparing an organic/inorganic hybrid material consisting of physically mixing monomeric alkoxysilanes into an epoxy composition.

A problem associated with sol-gel processes reported in the prior art relates to the use of an organic solvent which must eventually be removed from the final product. Another common problem associated with the sol-gel process is the relatively high amount (e.g. greater than 10% by weight) of volatile by-products (e.g., alcohol and water) generated during the sol-gel process. Because of these two limitations associated with the sol-gel process, only thin materials (membranes and protective coatings) have previously been developed while bulk materials have not been described in the prior art. The limitations of the known sol-gel processes makes it very difficult to prepare bulk materials in the industry.

In comparison with classical pre-formed silica fillers, sol-gel in-situ formed silica allows for the production of a reactive system with a low viscosity (e.g., less than 100 Pa·s at 25° C.) enabling better processing. However, as aforementioned, recurring problems associated with a sol-gel process include the added burden of having to remove any organic solvents, used in the process, from the final product; and the relatively high amount of volatile by-products generated during the sol-gel process.

It is therefore desirable to provide a process which enables the preparation of inorganic structures, in particular silicon-containing structures, which can be prepared more readily and more economical without the problems of the prior art processes such as without the addition of a solvent at any stage of the preparation. In addition, it is desired to provide a silica structure than can be useful for reacting into a thermosetting resin, such as an epoxy resin matrix, to provide an organic-inorganic hybrid material with improved properties.

SUMMARY OF THE INVENTION

One aspect of the present invention is directed to storage-stable inorganic structures, in particular silica structures, also referred to herein as "clusters", having reactive functionalities. For example, in one embodiment, the reactive functionalities may be amino groups.

Another aspect of the present invention is directed to a process for preparing storage-stable inorganic clusters with reactive functional groups, such as amino groups, including a sol-gel (hydrolysis and condensation) reaction of alkoxysilane precursors.

In one embodiment, the reactive inorganic clusters may have a silica-containing structure; wherein the reactive inorganic clusters prepared by the above process may be used as a curing agent for thermosetting resins such as epoxy resins.

DETAILED DESCRIPTION OF THE INVENTION

One broad aspect of the present invention comprises a storage-stable inorganic cluster with reactive functional groups, such as reactive amino groups useful as a curing agent for thermosetting resins.

Another broad aspect of the present invention comprises a process for preparing storage-stable reactive inorganic clusters with reactive functional groups, such as reactive amino groups.

Some of the key advantages of the present invention with regard to the process related to the synthesis of storage-stable reactive inorganic clusters (herein also referred interchangeably as "prehydrolyzed-condensed precursors") via a sol-gel process include for example: (1) the process allows a solvent-free preparation of the reactive inorganic clusters; (2) the process allows for a continuous addition of gaseous water into the process; (3) the process provides a self-catalyzed hydrolysis-condensation reaction through the amino groups of the precursors; and (4) the process allows for control of alkoxy group conversion during the process through viscosity measurements.

Some of the key advantages of the present invention with regard to the process related to producing the structure of the resultant reactive inorganic clusters include, for example: (1) the process provides storage-stable reactive inorganic clusters; (2) the process allows for the control of the functionality of reactive inorganic clusters, for example, (i) through the ratio of different amino precursors, or (ii) through the ratio of amino precursors and precursors with or without other functional groups; (3) the process allows for the control of the structure/branching degree of the reactive inorganic clusters through the ratio of condensed/uncondensed Si-species (D and T) based on $^{29}$Si NMR analysis; and (4) the process allows for adjusting the concentration of the reactive amino groups on the reactive inorganic clusters to an optimal concentration.

One particular advantageous embodiment of the present invention is the preparation of highly-condensed reactive inorganic clusters comprising functional amino groups with no addition of any solvent to the reactive system. The prepared reactive inorganic clusters can be stored without losing its reactivity or degrading; and then, the reactive inorganic clusters can subsequently be easily added to a reaction mixture during the manufacture of, for example, a thermosetting product such as an epoxy product. Instead of a particle-like characteristic, the reactive inorganic clusters exhibit a branched chain structure characteristic which enables a good distribution of the inorganic phase at a "nano" level; and thus, the reactive inorganic clusters are able to enhance the thermomechanical behavior of the resultant final thermosetting product. Because of the absence of solvents, the non-addition of a liquid such as water, and the very low release of volatiles (e.g., alcohol and/or water), the reactive inorganic clusters of the present invention find utility in compositions useful for preparing thick/bulk products, in addition to membranes and coatings.

DEFINITIONS

A "sol-gel" reaction process means a process which includes hydrolysis and condensation reactions.

"Storage-stable" with reference to a product means a product having no gelation during its storage for a predetermined period of time, generally for at least more than about one day; and preferably for at least more than about three months.

"Self-catalyzed" with reference to a compound means a compound that is catalyzed through its own chemical structure (i.e. a separate external catalyst is not required to be added to the compound).

"Structure/branching degree" with reference to clusters means how a final structure of the clusters is branched (based on the degree of alkoxysilanes conversion; a higher ratio of the condensed Si-species equals a higher branching degree of the clusters).

"Solvent-free" with reference to a composition means a composition containing no solvent except for any contaminant or trace amounts such as less than about 1 weight percent (wt %), preferably less than 5000 parts per million (ppm), and more preferably less than 1000 ppm.

"Essentially solvent-free" with reference to a composition means a composition in which no solvent has been purposely added to a composition and the composition contains solvent in amounts such as less than about 10 wt %, preferably less than about 5 wt %, more preferably less than about 2 wt %, and most preferably less than about 1 wt %.

"Alkoxysilane" means a compound in which silicon is attached by an oxygen bridge to an alkyl group, that is, R3SiOR. The alkoxysilane compound can react, for example, as follows: R3SiOR+=SiOH→=Si—O—SiR3+ROH. Examples of alkoxysilanes include tetramethoxysilane, tetraethoxysilane, tetrabutoxysilane, and mixtures thereof.

In general, the process of the present invention for preparing inorganic reactive clusters involves a sol-gel reaction of one or more inorganic materials, i.e., the process for preparing the inorganic reactive clusters of the present invention involves the synthesis of a pre-hydrolyzed-condensed material (the inorganic reactive clusters) via a sol-gel reaction process. The sol-gel reaction process includes reacting: (a) at least one or more inorganic materials, such as an alkoxy derivative of silica; and (b) water. Because water is used in the sol-gel process, the process of the present invention advantageously involves a solvent-free preparation of the inorganic reactive clusters. Accordingly, the pre-hydrolyzed-condensed material (the inorganic reactive clusters) is prepared by admixing, preferably in a continuous manner, (a) an alkoxy derivative such as for example alkoxysilane with (b) water, preferably gaseous water, to form the pre-hydrolyzed-condensed material (the inorganic reactive clusters).

The process of the present invention provides better control of the rate of water addition, and avoids problems of miscibility with the alkoxy derivative such as alkoxysilanes.

The process of the present invention also provides an easy means for preparing various types of inorganic reactive clusters with different structures, different branching and different reactivity.

The process of the present invention provides a self-catalyzed hydrolysis-condensation reaction through the functional groups of the alkoxy derivative, for example the amino groups, which dispenses with the need to add an additional catalyst. The process is therefore easy and uses readily available reactants.

In addition, the process of the present invention provides better control of alkoxy group conversion through viscosity measurements because (i) viscosity measurements are easy to perform; (ii) viscosity measurements have a lower cost as compared to the measurement of group conversion by Si NMR (a very long procedure using a very expensive instrument); and (iii) a correlation between viscosity and alkoxysilane conversion can be readily established.

The inorganic material, component (a), useful in the process of the present invention comprises an alkoxy derivative of an inorganic material. The inorganic material may include, for example, a silicon (Si), a titanium (Ti), a zirconium (Zr), an aluminum (Al) compound or mixtures thereof. In a preferred embodiment, the alkoxy derivative has at least one, and preferably two or three or more hydrolyzable alkoxy groups per molecule; and the alkoxy derivative has at least one functional group such as a primary amino group on its hydrocarbon chain.

The inorganic alkoxy derivative may contain reactive functional groups such as amino, epoxy, vinyl isocyanato, hydroxyl, phenolic, carboxyl groups, and the like. For example, the inorganic alkoxy derivative preferably used in the present invention may include alkoxysilanes having amino groups.

The alkoxysilanes having amino groups useful in the present invention may be one or more inorganic amino alkoxysilanes selected from, for example without limitation: amino alkoxysilane; 3-aminopropylmethyl diethoxysilane (APMS); 3-aminopropyl triethoxysilane (APS); 3-Aminopropyl trimethoxysilane; 4-aminobutyl triethoxysilane; N-(2-Aminoethyl)-3-aminopropylmethyl dimethoxysilane; N-(2-Aminoethyl)-3-aminopropyl trimethoxysilane; N-(6-Aminohexyl) aminopropyl trimethoxysilane; 3-(m-Aminophenoxy)propyl trimethoxysilane; m-Aminophenyl trimethoxysilane; p-Aminophenyl trimethoxysilane; 3-(1-Aminopropoxy)-3,3-dimethyl-1-propenyl trimethoxysilane; 3-Aminopropyl tris (methoxyethoxyethoxy)silane; N-Methylaminopropyl trimethoxysilane; N-Phenylaminopropyl trimethoxysilane; 3-(2-Aminoethylamino)propyl trimethoxysilane; (3-Aminopropyl)ethyl diethoxysilane; and combinations thereof.

Preferably, the amino alkoxysilane used in the present invention may be 3-aminopropylmethyl diethoxysilane (APMS); 3-aminopropyl triethoxysilane (APS), or mixtures thereof.

In another embodiment, glycido alkoxysilanes may be used instead of amino alkoxysilanes, and although the morphology of a hybrid network resulting from the use of glycido alkoxysilanes may be different, the thermo mechanical properties may also be improved.

The inorganic derivative, component (a), may be obtained commercially, for example APS and APMS are commercially available from ABCR, Gelest, or Dow Corning. In an alternative embodiment, the inorganic derivative may be prepared by well known processes using well known materials known in the art. For example, the inorganic derivative may be prepared by reacting silica material with an alkoxy compound.

The amino groups present in the molecule of alkoxysilanes are advantageously used as a catalyst for the hydrolysis and condensation reactions of alkoxy groups. No further addition of other catalysts is required in the composition. For example, the sol-gel reaction may be performed in a continuous or batch reactor containing only the alkoxysilanes with amino groups without the further addition of a catalyst.

In one embodiment, at least two or more alkoxysilanes may be used in the process of the present invention. For example, a combination of APS and APMS may be used in the process. In order to obtain branched inorganic clusters, it is preferable that the APS contribute to the majority of Si—O bonds during the inorganic cluster formation. In general, the molar ratio of APS/APMS is from about 0.1 to about 100, and preferably from about 0.2 to about 20. A more preferred molar ratio of APS/APMS may be in the range of from about 0.7 to about 7, and most preferably in the range of from about 1.3 to about 4.

The above ratios relate to the structure of the cluster product. In one embodiment, increasing APS may lead to an insoluble cluster, i.e., the cluster may not be able to mix with the epoxy resin, and decreasing APS (i.e., increasing APMS) the cluster may have a more linear structure and will not be as effective to improve the material property performances.

Optionally, the amino alkoxysilane may be blended with non-amino-containing alkoxysilane materials, i.e., other alkoxysilanes without amino groups. The non-amino-containing alkoxysilane may be added to the composition of the present invention to optimize the concentration of amino groups in the inorganic clusters and/or to provide additional properties to the clusters. When used, the concentration of the non-amino-containing alkoxysilane may depend on the particular precursor and whether such precursor will have a significant influence on the structure of the final inorganic reactive clusters. In general, the concentration of the non-amino-containing alkoxysilane is generally between about 0 wt % to about 99 wt %, preferably between about 0 wt % to about 90 wt %, more preferably between about 0 wt % to about 75 wt %, even more preferably between about 0 wt % to about 50 wt % and most preferably between about 0 wt % to about 20 wt % based on the weight of the total composition.

The water, component (b), useful in the process to make the inorganic precursor of the present invention may be any water from well known sources. Preferably, the water is introduced into the reaction process as "gaseous water", i.e., an inert gas saturated with moisture vapor. In one preferred embodiment, the water necessary for hydrolysis and condensation reactions of alkoxy groups may be introduced into a reactor in the gaseous state by saturation of an inert gas such as for example nitrogen, argon or any other well known inert gas.

The storage-stable reactive inorganic cluster composition of the present invention may optionally contain one or more other additives known to the skilled artisan and which are useful for their intended uses. The additives for the composition of the present invention may be optimized by the skilled artisan.

The sol-gel process for preparing the reactive inorganic clusters of the present invention involves hydrolysis and condensation reactions of alkoxy groups with water. The water may be introduced into a reactor in the gaseous state by saturation of an inert gas (e.g. nitrogen or argon). The entire sol-gel process is performed under inert atmosphere and the total amount of water introduced to the system is easily controlled. An additional advantage of the continuous addition of water in the gaseous state is that a solvent, which is usually required to homogenize all reaction components, is not needed.

The sol-gel process may conveniently be carried out at ambient temperature (about 25° C.) or at elevated temperatures higher than the ambient temperature. For example, the sol-gel process may be carried out at a temperature between about 20° C. and about 115° C. The process is preferably carried out, for example, at a temperature of from about 60° C. to about 100° C.; and more preferably at a temperature of from about 80° C. to about 95° C. The high temperature enables the removal of alcohol, an undesirable by-product, which is formed during the reaction. For example, the alcohol may be evaporated and removed from the reaction mixture in the inert gas flow. Then, the alcohol may be condensed and collected in a separate vessel. Direct removal of formed alcohol from the reaction mixture favors hydrolysis-condensation reactions and enables the reduction of the total reaction time.

After the sol-gel reaction process described above, the reactive inorganic clusters may still contain a small amount of alcohol (for example from about 2 mol % to about 3 mol %). The residual alcohol may be removed by well known techniques such as by vacuum distillation. If vacuum distillation of by-product (alcohol) is carried out, the vacuum distillation may be performed, generally, at temperature of from about 50° C. to about 110° C., and preferably from about 60° C. to about 90° C. Below the temperature of about 50° C., the reaction is too long and not very effective; and above the temperature of about 110° C. continuing the reaction does not provide any further economic benefit. In addition, above about 110° C. there is the risk that the chemical reactions in the clusters may continue and lead to an unusable gel.

The reaction mixture for preparing the reactive inorganic clusters may be stirred by conventional methods. Due to the low viscosity of the system, the addition of solvent is not necessary. The viscosity of the system may be for example, less than about 100 Pa·s, preferably less than about 50 Pa·s, more preferably less than about 20 Pa·s, even more preferably less than about 10 Pa·s, and even most preferably less than about 3 Pa·s at 25° C. The measurement of the viscosity enables easy control of the progress of the hydrolysis-condensation reactions and the final degree of condensation of the prepared inorganic reactive clusters.

Under process conditions, for example, the pH of the system in general is basic due to amino groups from precursors and the defined ratio of precursors with two and three hydrolysable alkoxy groups, branched inorganic reactive clusters with a broad size distribution are formed. Clusters with various dimensions are present in the system with preferably the majority of the clusters having a small size. For example, the clusters range in a size of less than about 100 μm (microns), preferably less than about 20 μm, more preferably less than about 5 μm, even more preferably less than about 2 μm, and most preferably less than about 1 μm. Smaller lower-condensed inorganic species act as "diluents" for the mixture.

In general, the sol-gel process is stopped when the viscosity of the system reaches a value of at least about 10 mPa·s at 25° C. and before macro-gelation. "Macro-gelation" as used herein is the formation of a macroscopic (a non-soluble) gel in all the volume of the reactor. Upon macro-gelation, the clusters would become unusable because the clusters could not be mixed with a thermosetting resin such as an epoxy resin. Preferably, the process is stopped when the viscosity value is in the range of from about 50 mPa·s to about 600 mPa·s at 25° C.

Using the process of the present invention, reactive inorganic clusters with total alkoxy group conversion from about 40% to about 95%, more preferably between about 50% to about 90%, and most preferably from about 60% to about 80%, are obtained.

If the sol-gel process is stopped too early, which is simply indicated by a lower viscosity value of the system (viscosity<10 mPa·s at 25° C.), the product may still contains a large amount of unhydrolyzed alkoxysilane bonds. Therefore, hydrolysis-condensation reactions may continue during the subsequent processing steps, such as for example, during the mixing of the clusters into a thermosetting resin such as an epoxy system, and during the curing of the thermosetting resin, leading to the formation of a high amount of alcohol (an undesirable by-product). The exact amount of released alcohol will depend on various factors including for example, on the cluster composition. For example, in reaction mixtures containing APMS and APS, a maximum amount of released ethanol may be close to about 50 wt. %.

The alcohol released during the curing of a thermosetting resin, such as an epoxy resin material, may lead to the undesirable formation of bubbles and cracks in the final cured material. Moreover, in this instance, the formed inorganic clusters are not highly condensed, i.e., the extent of the condensation reaction is low, and further growth of the inorganic clusters is limited by the formation of the organic thermosetting resin network (e.g., a cross-linked epoxy matrix) leading to gelation and vitrification (i.e., phase transitions which appear systematically during the formation of a thermosetting resin network such as an epoxy network) of the entire system. In addition, under the above disadvantages conditions, the thermo-mechanical properties of the final thermoset products are usually not optimal. Thus, it is advantageous to minimize the release of alcohol during the curing of a thermosetting resin.

If the sol-gel process is stopped too late, the process may lead to the formation of a macrogel (an insoluble structure). When the viscosity value of the system is higher than about 600 mPa·s at 25° C., especially when the viscosity is higher than about 2000 mPa·s at 25° C., and most especially when the viscosity is higher than about 3000 mPa·s at 25° C., the system contains only very few unreacted alkoxy groups. In this instance, the inorganic clusters are well formed and no problem with bubble formation due to the by-product alcohol is observed during curing. Nevertheless, when the inorganic clusters are mixed into a thermosetting resin formulation such as an epoxy formulation, the high conversion degree of alkoxy groups (for example generally about 90% depending on the inorganic reactive cluster composition) may lead to too fast of a hydrolysis and condensation of remaining alkoxy groups accompanied with the fast formation of a macrogel and the fast creation of inorganic insoluble domains in the thermosetting resin matrix. In other words, the sol-gel process (hydrolysis and condensation) may continue after the inorganic clusters are admixed into the thermosetting resin. The admixing of the inorganic clusters with a high conversion degree leads in a short time (minutes) to a formation of macrogel in the thermosetting matrix. Therefore, no satisfactory connections between the inorganic clusters and thermosetting matrix may be formed in the thermosetting matrix; and thus, the final prepared material may not exist as an interpenetrated organic-inorganic network. As used herein an "interpenetrated network" means two networks (organic-thermosetting resin and inorganic-silica/silicon from the inorganic clusters) that are well interconnected.

Accordingly, if the sol-gel process is not carried out properly, the inorganic clusters may have a reinforcing effect and improved thermo-mechanical properties, but the created inorganic domains may be too large to be well incorporated into the organic thermosetting network at a nano-level; that is, if the domains are too large, the large domains result in a non-homogeneous (non-interpenetrated) system. Instead, the inorganic domains result in the formation of micro- or macro-separated phases (organic and inorganic). Therefore, the final prepared hybrid material may not be clear or transparent due to the presence of microscopic inorganic structures.

The prepared inorganic reactive clusters of the present invention have sufficiently low viscosity (i.e., less than about 100 Pa·s) and are advantageously liquid at room temperature. Thus, the clusters may be easily admixed into an epoxy resin composition and incorporated into a liquid epoxy formulation. The prepared reactive inorganic clusters of the process of the present invention may contain fully converted $T_3$ and $D_2$ units in the amount of at least about 50% and about 15% (expressed as a percentage of D or T species), respectively; and preferably in the amount of at least about 60% and about 20%, respectively. The nomenclature referring to $T_3$ and $D_2$ are well known in the art and are used to describe the type of siloxane units in siloxane-based compounds. D herein refers to diethoxysilane, T refers to triethoxysilane; whereas the superscript number is the number of hydrolyzed ethoxy groups, and the subscript number is the number of condensed ethoxy groups. The prepared reactive inorganic clusters that fulfill the above conditions form a storage-stable system suitable for further admixing into a thermosetting resin formulation such as an epoxy resin formulation. Also, the structure/branching degree of the clusters may be controlled through the ratio of the condensed/uncondensed Si-species (D and T) based on $^{29}Si$ NMR analysis.

The reactive inorganic clusters prepared by the sol-gel process of the present invention offer several advantages because of the structure of the reactive inorganic clusters. For example, the clusters have long storage-stability in a sealed container. As aforementioned, by "storage-stable" herein it is meant that the inorganic clusters are stable for certain predetermined extended period of time, i.e., the clusters do not form macro-gelation for more than about 1 day, preferably for more than about 1 week, more preferably for more than about 2 weeks, even more preferably for more than about 1 month, and most preferably for more than about 3 months when stored at 25° C. in a sealed container.

The functionality of the clusters may be controlled through the ratio of different amino precursors; or through the ratio of different amino precursors and precursors with or without other functional groups.

Furthermore, the present invention allows the adjusting of the optimal concentration of reactive amino groups for the clusters; that is, the total amount of amino groups in the clusters can be adjusted by a selection of suitable precursors with different amount of amino groups. Thus, the concentration of reactive amino groups may be adjusted for optimal performance.

The clusters may be advantageously used as a curing agent for thermosetting resins in a theremosettable composition.

The thermosetting resin may be selected from known thermosetting resins in the art including for example epoxy resins; isocyanate resins; (meth)acrylic resins; phenolic resins; vinylic resins; styrenic resins; polyester resins; melamine resins; vinylester resins; silicone resins; and mixtures thereof.

In one embodiment, for example, a reactive inorganic cluster with a silica structure may be incorporated into an epoxy resin matrix to prepare a silicon-modified epoxy resin containing hydrolysable alkoxysilane groups as described in U.S. Provisional Patent Application Ser. No. 61/174,251 filed Apr. 30, 2009 by Benes et al.; incorporated herein by reference. The above silicon-modified epoxy resin system, for example, may further be cured with a conventional hardener at an elevated temperature to form a cured epoxy resin product with improved thermo-mechanical property.

EXAMPLES

The following examples and comparative examples further illustrate the present invention in detail but are not to be construed to limit the scope thereof. The sol-gel process leading to the formation of reactive inorganic clusters, formulation of epoxy systems with the reactive inorganic clusters and the properties of cured product organic-inorganic networks are illustrated in the following Examples.

The following Examples 1 to 4 and Comparative Example A describe the preparation of reactive inorganic clusters.

Example 1

Into a batch reactor equipped with a mechanical stirrer, thermometer, nitrogen gas introduction tube, a mixture of 150 g of 3-aminopropyltriethoxysilane (APS, produced by ABCR) and 64.8 g of 3-aminopropylmethyldiethoxysilane (APMS, produced by ABCR) were introduced. The mixture of APMS and APS was heated to 90° C. and purged with nitrogen saturated by water vapor in order to promote the hydrolysis and condensation reactions. The water saturation of the gas was performed at 25° C. in bubbler and outgoing nitrogen contained 16 mg $H_2O$ in 1 $dm^3$. Ethanol formed during the reactions was evaporated and then condensed in a separate vessel. The course of reactions was controlled by measuring the viscosity of the mixture. The reaction was stopped when the viscosity reached 72 mPa·s at 25° C. From the Si NMR results, the conversion of alkoxysilane groups was 63%. The obtained product (reactive inorganic clusters) was a clear transparent liquid which was used for further preparation of final organic-inorganic hybrid networks.

Example 2

In the same reactor as described in Example 1, a mixture of 150 g of APS and 64.8 g of APMS were introduced in the reactor. The reaction was carried out following the same procedure as described in Example 1. The reaction was stopped when the viscosity reached 60 mPa·s at 25° C. From the Si NMR results, the conversion of alkoxysilane groups was 57%. The obtained product (reactive inorganic clusters) was a clear transparent liquid which was used for further preparation of final organic-inorganic hybrid networks.

Example 3

In the same reactor as described in Example 1, a mixture of 150 g of APS and 64.8 g of APMS were introduced in the reactor. The reaction was carried out following the same procedure as described in Example 1. The reaction was stopped when the viscosity reached 66 mPa·s at 25° C. The mixture was then heated for 30 min at 90° C. under vacuum in order to remove the residue of ethanol. The obtained product (reactive inorganic clusters) had a viscosity of 108 mPa·s at 25° C., the conversion of alkoxysilane groups was 64% (from Si NMR results). The product was a clear transparent liquid which was used for further preparation of final organic-inorganic hybrid networks.

Example 4

In the same reactor as described in Example 1, a mixture of 150 g of APS and 64.8 g of APMS were introduced in the reactor. The reaction was carried out following the same procedure as described in Example 1. The reaction was stopped when the viscosity reached 559 mPa·s at 25° C. From the Si NMR results, the conversion of alkoxysilane groups was 85%. The obtained product (reactive inorganic clusters) was a clear transparent liquid which was used for further preparation of final organic-inorganic hybrid networks.

Comparative Example A

In the same reactor as described in Example 1, a mixture of 150 g of APS and 64.8 g of APMS were introduced in the reactor. The reaction was carried out following the same procedure as described in Example 1. The reaction was stopped when the viscosity reached 4.5 mPa·s at 25° C. From the Si NMR results, the conversion of alkoxysilane groups was 23%. The obtained product was a clear transparent liquid which was used for further preparation of final organic-inorganic hybrid networks.

The following standard analytical equipments and methods are used in the Examples to obtain the various measurements described as follows:

Storage Stable Measurements

Storage stability is determined by measuring the viscosity of a reaction product as a function of storage time. In order to control humidity, a container used in this method should be tightly closed and sealed between each measurement. Preferably the containers should be stored under inert atmosphere (e.g. dry nitrogen blanket) and should be kept refrigerated. An increase of viscosity during storage indicates a continuation of hydrolysis and condensation reactions, e.g. limited storage stability. The maximum storage stability is determined when an insoluble gel is formed.

NMR Measurements

The NMR measurements were carried out using the following method: $^{29}Si$ NMR analyses were performed using a Bruker DRX 400 spectrometer operating at 79.5 MHz. $^{29}Si$ NMR spectra were obtained with a 10 mm Broad Band probe at 298 K. An external standard, HMDS (hexamethyldisiloxane) was used for determination of quantity of silica in the solution. Deuterated chloroform with chromium triacetate (concentration: $10^{-2}$ M) was used as the solvent.

Viscosity Measurements

The viscosity measurements were carried out using the following method: Viscosity measurements of the reaction products at different reaction times were realized using a rheometer AR 1000 (Thermal Analysis) at 25° C. A cone/plate geometry (60 mm diameter, 2° angle, 66 μm gap) and a shear rate sweep from 1 to 100 $s^{-1}$ were used.

In Table I, the compositions (distributions of Si species based on $^{29}Si$ NMR analyses) of prepared reactive inorganic clusters prepared according Examples 1-4 and the product of Comparative Example A are given.

TABLE I

Composition (based on $^{29}$Si NMR analysis) of Products

| | Distribution of Si Species | | Total Alkoxysilane |
|---|---|---|---|
| | D [%] $D_0/D_1/D_2$ | T [%] $T_0/T_1/T_2/T_3$ | Conversion [%] |
| Example 1 | 48/34/18 | 10/23/8/59 | 63 |
| Example 2 | 40/32/28 | 7/29/10/54 | 57 |
| Example 3 | 17/52/31 | 10/28/12/50 | 64 |
| Example 4 | 15/35/50 | 1/8/12/59 | 85 |
| Comparative example A | 76/19/5 | 56/25/6/13 | 23 |

Example 5

In the same reactor as described in Example 1, a mixture of 73.7 g of APS and 95.5 g of APMS were introduced in the reactor. The reaction was carried out following the same procedure as described in Example 1. The reaction was stopped after 150 minutes. From the Si NMR results, the conversion of alkoxysilane groups was 47%. The obtained product (reactive inorganic clusters) was a clear transparent liquid.

Example 6

In the same reactor as described in Example 1, a mixture of 95.5 g of APMS and 52 g of tetraethoxysilane (TEOS, produced by Aldrich and commercially available) were introduced in the reactor. The reaction was carried out following the same procedure as described in Example 1. The reaction was stopped after 150 minutes. From the Si NMR results, the conversion of alkoxysilane groups was 90%. The obtained product (reactive inorganic clusters) was a clear transparent liquid.

Example 7

In the same reactor as described in Example 1, a mixture of 95.5 g of APMS and 5.2 g of tetraethoxysilane (TEOS, produced by Aldrich and commercially available) were introduced in the reactor. The reaction was carried out following the same procedure as described in Example 1. The reaction was stopped after 150 minutes. From the Si NMR results, the conversion of alkoxysilane groups was 56%. The obtained product (reactive inorganic clusters) was a clear transparent liquid.

While the present disclosure includes a limited number of embodiments, those skilled in the art, having benefit of this disclosure, will appreciate that other embodiments may be devised which do not depart from the scope of the present invention. Accordingly, the scope of the present invention should be limited only by the attached claims.

What is claimed is:

1. A reactive inorganic cluster composition comprising a storage-stable reaction product of (a) an alkoxysilane having an amino group, wherein the alkoxysilane having an amino group is a mixture of 3-aminopropylmethyl diethoxysilane and 3-aminopropyl triethoxysilane, wherein a molar ratio of the 3-aminopropyl triethoxysilane to the 3-aminopropylmethyl diethoxysilane is in a range of from 0.2 to 7 with (b) gaseous water, wherein the reactive inorganic cluster composition includes reactive amino groups and wherein an alcohol byproduct is simultaneously evaporated during a reaction of the alkoxy derivative and gaseous water.

2. A process for preparing a storage-stable reactive inorganic cluster composition comprising reacting (a) an alkoxy derivative of an inorganic material, wherein the alkoxy derivative of the inorganic material is an alkoxysilane derivative, and wherein the alkoxysilane derivative includes reactive amino groups; and (b) gaseous water, wherein a storage-stable reactive inorganic cluster is formed, and wherein the process does not include an addition of a solvent.

3. The process of claim 2, wherein the alkoxysilane derivative having amino functional groups is selected from 3-aminopropylmethyl diethoxysilane (APMS); 3-aminopropyl triethoxysilane (APS), or mixtures thereof.

4. The process of claim 2, wherein the process comprises continuously adding gaseous water.

5. The process of claim 2, wherein the process is a hydrolysis-condensation reaction self-catalyzed through the reactive amino groups present in the alkoxysilane derivative.

6. The process of claim 2, where the alkoxy derivative of the inorganic material and the gaseous water form a reaction mixture and the process includes measuring a viscosity of the reaction mixture to monitor the conversion of alkoxy groups of the alkoxy derivative.

7. A process for curing a thermosetting resin with a storage-stable reactive inorganic reactive inorganic cluster composition comprising:
   (i) preparing the inorganic cluster composition by reacting (a) an alkoxy derivative of an inorganic material, wherein the alkoxy derivative of the inorganic material is an alkoxysilane derivative and wherein the alkoxysilane derivative includes reactive amino groups; and (b) gaseous water, in the absence of a solvent, and
   (ii) adding the inorganic cluster composition to a thermosetting resin and curing the resin.

8. The process of claim 2, including preparing the storage-stable reactive inorganic cluster with the reactive amino groups by subjecting the alkoxy derivative of the inorganic material to a sol-gel (hydrolysis and condensation) reaction process under conditions to form a reactive inorganic cluster, wherein the sol-gel reaction includes reacting the alkoxy derivative of an inorganic material with gaseous water.

* * * * *